Figure 1:
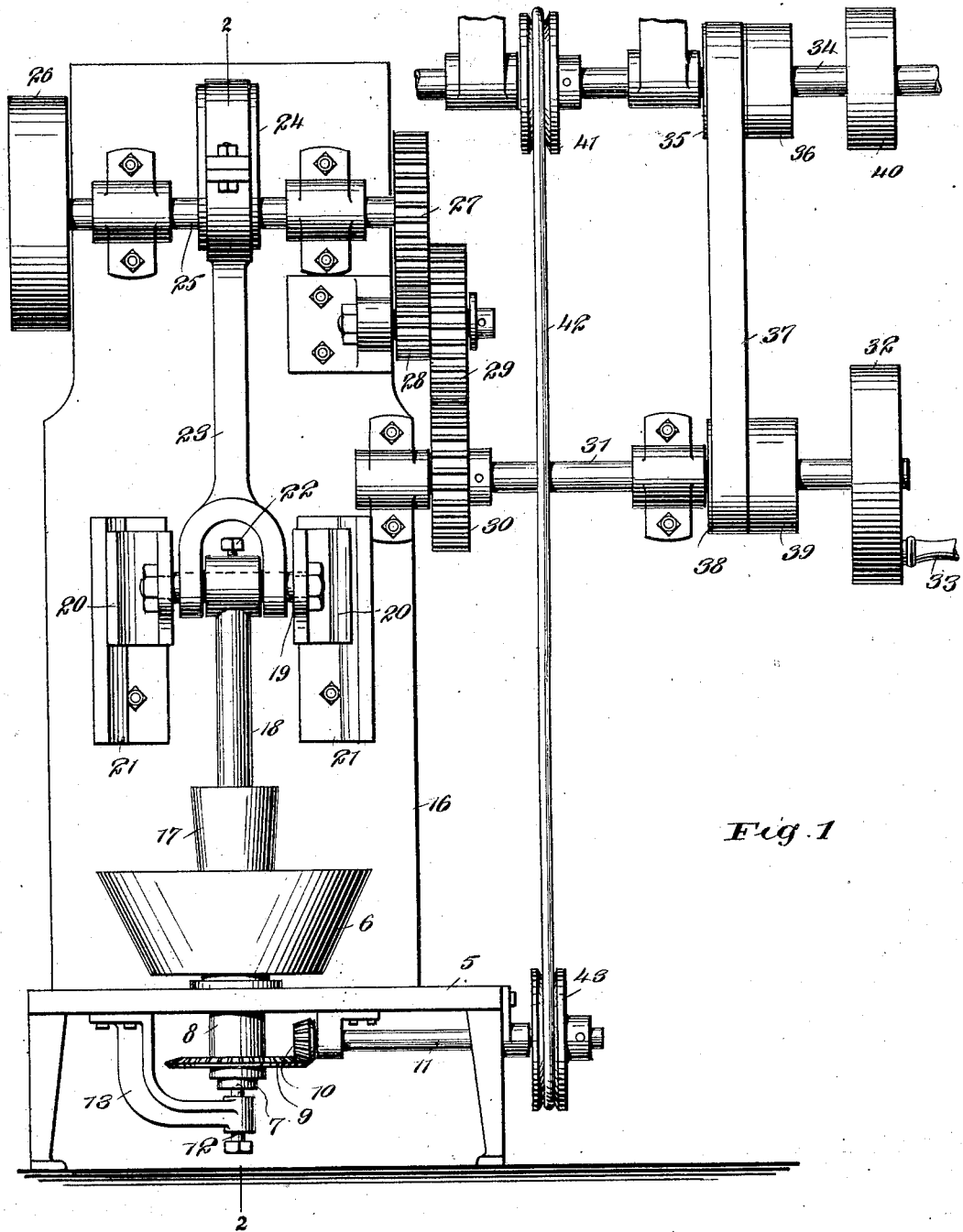

No. 691,115. Patented Jan. 14, 1902.
L. COHNHOFF.
MIXER AND KNEADER.
(Application filed May 27, 1901.)
(No Model.) 2 Sheets—Sheet 1.

WITNESSES:
INVENTOR
Louis Cohnhoff
BY
ATTORNEYS

No. 691,115. Patented Jan. 14, 1902.
L. COHNHOFF.
MIXER AND KNEADER.
(Application filed May 27, 1901.)
(No Model.) 2 Sheets—Sheet 2.
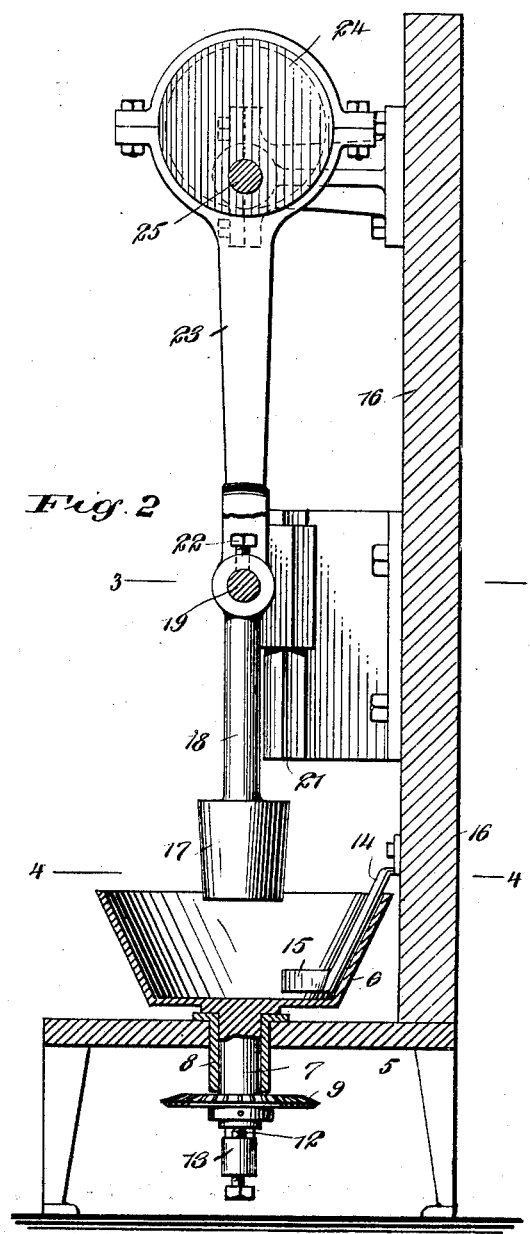
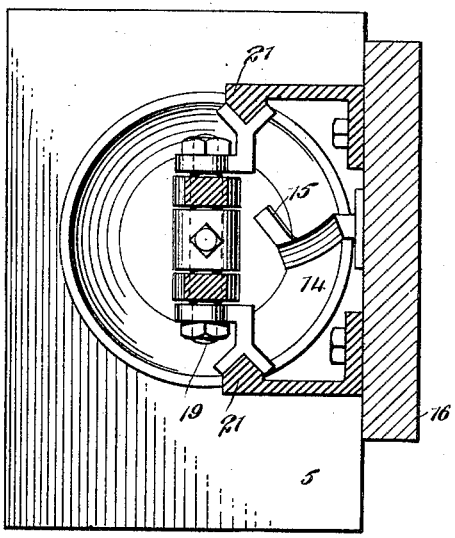
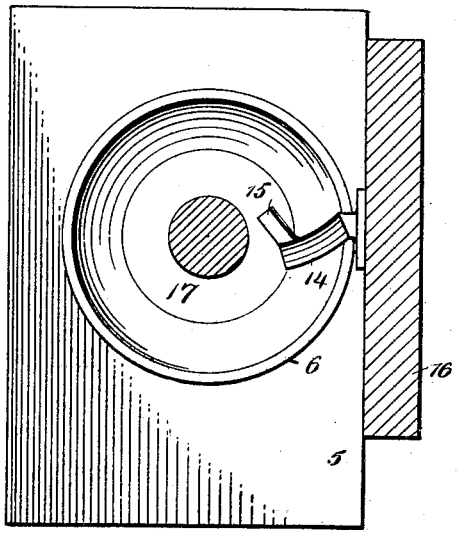
WITNESSES:
INVENTOR
Louis Cohnhoff
BY
ATTORNEYS

UNITED STATES PATENT OFFICE.

LOUIS COHNHOFF, OF MATTAPAN, MASSACHUSETTS, ASSIGNOR, BY DIRECT AND MESNE ASSIGNMENTS, TO HIMSELF AND SAMUEL L. SIEGEL, BOTH OF ROXBURY, MASSACHUSETTS, AND ISAAC H. FEINBERG, OF BOSTON, MASSACHUSETTS.

MIXER AND KNEADER.

SPECIFICATION forming part of Letters Patent No. 691,115, dated January 14, 1902.

Application filed May 27, 1901. Serial No. 62,146. (No model.)

*To all whom it may concern:*

Be it known that I, LOUIS COHNHOFF, a citizen of the United States, and a resident of Mattapan, in the county of Suffolk and State of Massachusetts, have invented certain new and useful Improvements in Mixers and Kneaders, of which the following is a full, clear, and exact description.

This invention relates to improvements in machines particularly adapted for mixing and kneading dough; and the object is to provide a machine of this character that shall be of simple construction, easily operated, and by means of which big batches of dough may be quickly mixed and kneaded.

I will describe a mixer and kneader embodying my invention and then point out the novel features in the appended claims.

Reference is to be had to the accompanying drawings, forming a part of this specification, in which similar characters of reference indicate corresponding parts in all the figures.

Figure 1 is a front elevation of a mixer and kneader embodying my invention. Fig. 2 is a section on the line 2 2 of Fig. 1. Fig. 3 is a section on the line 3 3 of Fig. 2, and Fig. 4 is a section on the line 4 4 of Fig. 2.

Referring to the drawings, 5 designates the base-plate of the machine, on which is mounted a pan 6. This pan 6 is designed to have a rotary motion, and therefore it is provided with a spindle 7, which has a bearing in a sleeve 8, extended through an opening in the base 5. This sleeve 8 may be provided with chambers for receiving oil, if desired. On the lower portion of the spindle 8 is a bevel-gear 9, meshing with a bevel-pinion 10 on a counter-shaft 11. As here shown, the spindle has a step-bearing on a bolt 12, supported in a hanger 13. Extended into the pan 6 is an arm 14, to the lower end of which is attached a curved blade 15, designed to force the dough toward the center of the pan as said pan is rotated. The arm 14 is attached to an upright 16, which comprises a portion of the machine-frame.

A pestle or pounder 17 for pounding and kneading the dough has its stem 18 connected to a cross-head 19, which has bearings 20 at its ends, designed to slide on guideways 21, attached to the upright 16. This pestle or pounder will be of tin or covered with a sheet of tin, so as to prevent the dough sticking thereto, and it is mounted to swing on the cross-head 19, whereby it may be swung out of the way when dough is to be removed from the pan. When in operation, however, it is held rigidly with relation to the cross-head by means of a set-screw 22. From the cross-head an eccentric-rod 23 extends upward and connects with an eccentric 24 on a counter-shaft 25, having bearings in blocks secured to the upright 16. On one end of this counter-shaft is a balance-wheel 26, and on the other end is a gear-wheel 27, meshing with a pinion 28 on the shaft of a gear-wheel 29, which meshes with a gear-wheel 30 on the driving-shaft 31, which is provided with a fly-wheel 32, on which is a crank-handle 33, so that the machine may be operated manually, if desired.

Arranged above the driving-shaft 31 is a main shaft 34, on which are mounted fast and loose pulleys 35 and 36, which are designed to be engaged by means of a band 37 with either of the fast or loose pulleys 38 39 on the driving-shaft. The main shaft 34 is driven from any suitable source of power. I have here shown a band-pulley 40 on said shaft, with which a band leading from an engine or the like may engage. Also on the shaft 34 is a pulley 41, from which a band 42 extends to a pulley 43 on the shaft 11.

In operation after placing the flour and water in the pan 6 and setting the machine in motion the pan 6 will be rotated by its gearing, and the flour and water, coming in contact with the blade 15, will be forced toward the center of the pan, where they will be acted upon by the pestle or pounder 17 and thoroughly mixed and kneaded. It may be here stated that the bottom of the pan 6 should be made of iron, so as to withstand the pressure of the pounder. This pressure, however, is somewhat relieved by the step-bearing 12.

Having thus described my invention, I claim as new and desire to secure by Letters Patent—

1. A mixer and kneader, comprising a pan, means for imparting a rotary motion to the pan, a cross-head, a pestle mounted to swing on said cross-head, a shaft, an eccentric on said shaft, and a connection between said eccentric and the cross-head, substantially as specified.

2. A mixer and kneader, comprising a pan, means for imparting a rotary movement to the pan, a fixed arm extended into the pan, a curved blade on the lower end of said arm, a cross-head arranged above the pan, a pestle attached to said cross-head, a shaft, an eccentric on said shaft, and an eccentric-rod connecting the said eccentric with the cross-head, substantially as specified.

3. A mixer and kneader, comprising a pan, an arm extended into said pan, a curved blade on the lower end of said arm, means for imparting a rotary motion to the pan, a cross-head arranged above the pan, a pestle attached to said cross-head, a shaft, an eccentric on said shaft, an eccentric-rod connection between said eccentric and the cross-head, a balance-wheel on said shaft, a driving-shaft, and gear connections between said driving-shaft and the first-named shaft, substantially as specified.

4. In a mixer and kneader, a base, a sleeve extended through said base, a pan, a spindle on said pan extended through the said sleeve, a step-bearing for the lower end of the spindle, a gear-wheel on said spindle, a shaft, a pinion on said shaft engaging with the gear-wheel, a main shaft, a band connection between the main shaft and the first-named shaft, and the vertically-operating pestle, substantially as specified.

In testimony whereof I have signed my name to this specification in the presence of two subscribing witnesses.

LOUIS COHNHOFF.

Witnesses:
ADOLPH ROSENTHAL,
LOUIS AARON.